Figure 1:
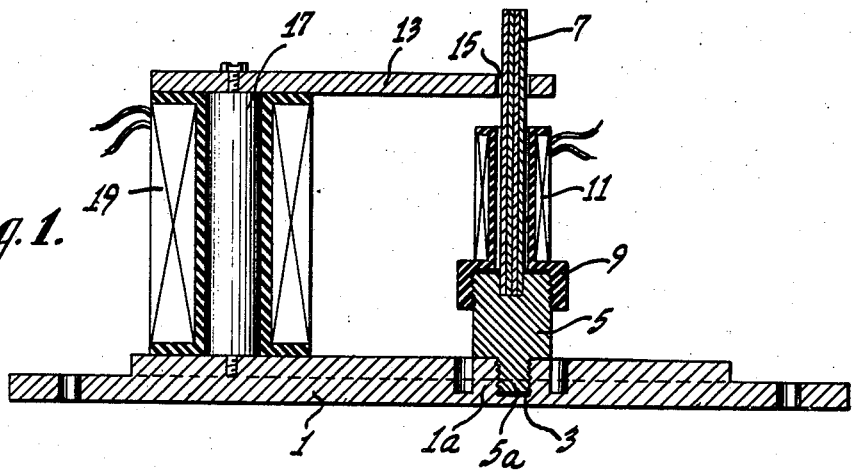

April 26, 1949.  H. F. OLSON ET AL  2,468,270
MAGNETOSTRICTIVE TRANSDUCER
Filed Dec. 30, 1944

INVENTORS.
HARRY F. OLSON
& JOHN PRESTON
BY CD Tuska
ATTORNEY

Patented Apr. 26, 1949

2,468,270

UNITED STATES PATENT OFFICE 2,468,270

MAGNETOSTRICTIVE TRANSDUCER

Harry F. Olson, Princeton, and John Preston, Hopewell, N. J., assignors to Radio Corporation of America, a corporation of Delaware Application December 30, 1944, Serial No. 570,699

2 Claims. (Cl. 177—386)

This invention relates to transducers, and more particularly to a magnetostrictive signal translating device especially useful in underwater signalling systems, echo ranging systems, and the like.

Conventional magnetostrictive projectors usually comprise a hollow casing enclosed at one end by a vibratory, magnetic diaphragm to which a plurality of magnetostrictive tubes are soldered. It is desirable that all of the tubes shall have the same resonant frequency, and, to this end, care is exercised to see that all of the tubes are of the same length. Notwithstanding this precaution, however, the resonance will not be the same, due to non-uniformity of the soldered joints. Another disadvantage of conventional magnetostrictive projectors is that the diaphragm is usually about an inch thick. This makes it difficult to drive all parts of the diaphragm in phase due to the inherent stiffness coupled with moding. These factors contribute to a relatively low efficiency.

The complete unit or projector also includes a coil or winding about each of the magnetostrictive tubes or rods. Another feature of prior art projector driving systems which contributes to the lowered efficiency thereof is the relatively large clearance between each coil and its associated magnetostrictive tube.

The primary object of our present invention is to provide an improved magnetostriction transducer which will be free from the aforementioned and other similar difficulties inherent in prior art projectors.

More particularly, it is an object of our present invention to provide an improved magnetostriction transducer which has a very high efficiency.

Another object of our present invention is to provide, in magnetostriction transducers, an improved driving system which will drive all parts of the diaphragm with the same phase.

It is also an object of our present invention to provide, in a magnetostriction transducer as aforesaid, a plurality of driving or receiving members, hereinafter referred to as signal translating members, each of which can be tuned separately to the desired, resonant frequency and which will retain its resonance to this frequency without alteration when coupled to the diaphragm.

It is also an object of our present invention to provide an improved magnetostriction transducer, as above set forth, which is relatively simple in construction, economical in cost, and highly efficient in use whether as a projector or as a receiver.

In accordance with our present invention, we provide a driving or receiving system which includes one or more signal translating members, each comprising a supporting block of magnetic material that is coupled to the diaphragm by a threaded stud for easy removal therefrom, a magnetostrictive bar or rod secured to the supporting block, and extending therefrom; and also supported by the block, and surrounding the magnetostrictive member in closely coupled relation thereto, a winding which carries the signal currents. We have found that the efficiency of the responsive element is very greatly increased when a laminated magnetostrictive member is used in place of the conventional magnetostrictive tubes. Also, by making the signal translating members, which comprise the supporting block, laminated magnetostrictive bars and the coils therearound, removable from the diaphragm by the threaded connection, each discrete driving or signal translating unit can separately be tuned and will retain the desired tuning response when mounted on the diaphragm.

The novel features that we consider characteristic of our invention are set forth with particularity in the appended claims. The invention itself, both as to its organization and method of operation, as well as additional objects and advantages thereof, will best be understood from the following description of two embodiments thereof, when read in connection with the accompanying drawing, in which Figure 1 is a central, sectional view through one form of transducer constructed according to our present invention and employing only a single driving or signal translating unit, and Figure 2 is a sectional view of a transducer employing a plurality of such units.

Figure 2:
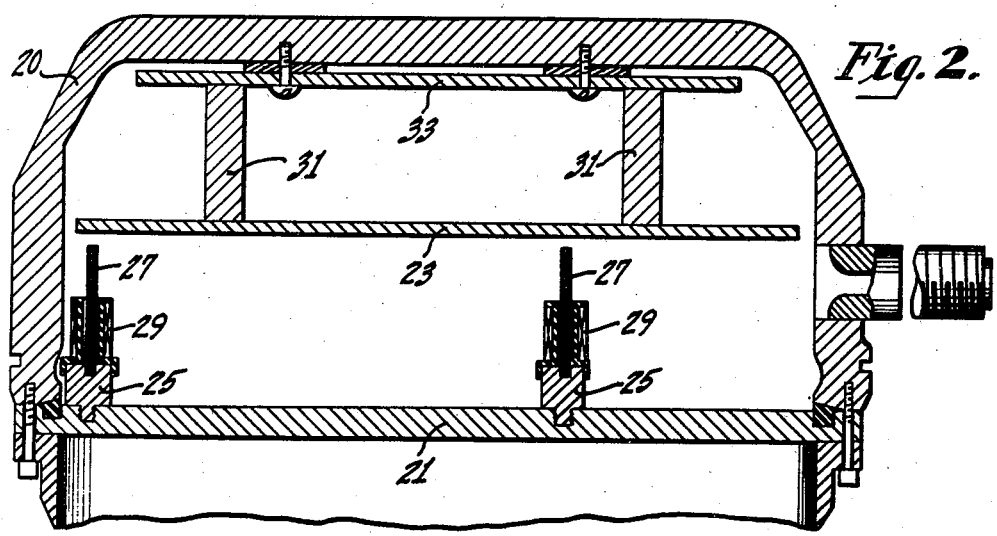

Referring more particularly to the drawing, wherein similar reference characters designate corresponding parts throughout, there is shown, in Figure 1, a diaphragm 1 having a central, vibratory portion 1a provided with a threaded opening 3. Threaded into the opening 3 is an externally threaded extension 5a of a magnetic supporting block 5, to which is secured a laminated bar or rod 7 of magnetostrictive material such as nickel. The member 7 may comprise a stack of nickel laminations from 0.005 inch thick to 0.20 inch thick to form a bar of from 0.1 inch by 0.1 inch to 0.25 inch by 0.25 inch.

Threaded onto the upper end of the supporting block 5 is an insulated coil form 9 which fits closely around the laminated bar 7 without contact therewith as shown, and carries a signal coil 11. The magnetic circuit is completed by a magnetic plate 13 having an opening 15 through which the upper end of the bar 7 extends, and a magnetic core 17 secured to the diaphragm 1 and around which is a coil 19 which carries a polarizing current.

From the foregoing description, it will be readily apparent that the block 5, the magnetostrictive bar 7 and the winding 11 can be removed very easily, as a unit, from the diaphragm 1. This unit can be pretuned to any desired, resonant frequency and readily remounted on the diaphragm.

In Figure 2, there is shown a transducer comprising an open ended casing 20, the open end of which is closed off by a diaphragm 21 on which are mounted a plurality of magnetic mounting blocks 25 of the type described above. Each of the blocks 25 has secured thereto, and extending upwardly therefrom toward a magnetic plate 23, a bar 27 which is preferably of the laminated type described above. As in the case of Figure 1, each of the bars 27 is surrounded by a coil 29 which is closely coupled thereto. A polarizing flux is supplied by one or more permanent magnets 31 which connect the plate 23 to a second plate 33, in turn secured to the casing 20.

The signal translating units comprising the mounting blocks 25, the laminated bars 27, and the coils 29 are distributed in any desired manner over the entire surface of the diaphragm, and as many of them may be used as will be found necessary. Only two such units are shown in the drawing, for the sake of clearness. It will be understood that each of the units can be removed individually and separately tuned to a common resonant frequency, after which all of the units can be remounted on the diaphragm 21 with the assurance that they will remain tuned to this frequency.

A projector having a driving system of the type described above can employ a diaphragm which is much thinner than conventional diaphragms (for example, a diaphragm of about ⅜ inch in thickness). Since the diaphragm is relatively thin, and is driven by units of the same resonant frequency, it is apparent that all parts of the diaphragm will move with the same phase. Moreover, by reason of the small space between each coil 29 and its associated magnetostrictive bar 27, these parts are closely coupled and this reduces the leakage reactance, thereby further increasing the efficiency of the system.

Although we have shown and described two projectors employing driving systems in accordance with our present invention, it will undoubtedly be apparent to those skilled in the art that many other forms of projectors, as well as variations in the driving system itself, are possible.

We, therefore, desire that our invention shall not be limited except insofar as is made necessary by the prior art and by the spirit of the appended claims.

We claim as our invention:

1. In a magnetostrictive transducer having a vibratory diaphragm, a signal translating member adapted to be removably attached to said diaphragm comprising a supporting block of magnetic material having a threaded extension at one end for connection to said diaphragm, a magnetostrictive member fixedly connected to the other end of said block and extending therefrom whereby said member is effectively coupled to the diaphragm in spaced relation thereto, a coil form mounted on and secured to said block and surrounding said magnetostrictive member in spaced relation thereto, and a coil supported by said coil form, said signal translating member being removable from said diaphragm whereby the operating frequency thereof may be adjusted and the transducer assembled without the mechanical coupling with the diaphragm affecting the resonant frequency of said member.

2. In a magnetostrictive transducer having a vibratory diaphragm, a signal translating member adapted to be removably attached to said diaphragm comprising a supporting block of magnetic material having a threaded extension at one end for connection to said diaphragm, a magnetostrictive member fixedly connected to the other end of said block, whereby said last named member is effectively coupled to the diaphragm in spaced relation thereto, said threaded extension and said member extending in opposite directions from said block along a common axis, a coil form mounted on and secured to said block and closely enclosing at least a portion of said member without touching the surface thereof, and a coil supported by said coil form.

HARRY F. OLSON.
JOHN PRESTON.

REFERENCES CITED

The following references are of record in the file of this patent:

UNITED STATES PATENTS

| Number | Name | Date |
|---|---|---|
| 2,063,950 | Steinberger | Dec. 15, 1936 |
| 2,328,496 | Rocard | Aug. 31, 1943 |
| 2,346,655 | Benioff | Apr. 18, 1944 |
| 2,407,243 | Batchelder | Sept. 10, 1946 |

FOREIGN PATENTS

| Number | Country | Date |
|---|---|---|
| 604,571 | Atlas-Werke | Oct. 23, 1934 |
| 832,891 | Carpentier | Oct. 4, 1938 |